Dec. 24, 1929.  J. W. TAYLOR  1,740,794
LIQUID DASHPOT
Filed Jan. 19, 1928

Inventor:—
John W. Taylor
by George E. Folkes.
his Attorney

Patented Dec. 24, 1929

1,740,794

UNITED STATES PATENT OFFICE

JOHN WILLIAM TAYLOR, OF BIRMINGHAM, ENGLAND, ASSIGNOR TO W. & T. AVERY LIMITED, OF BIRMINGHAM, ENGLAND

LIQUID DASHPOT

Application filed January 19, 1928, Serial No. 247,926, and in Great Britain October 15, 1927.

This invention has reference to improvements in or relating to dashpots employing liquid as a damping medium and is more particularly concerned with dashpots of the aforesaid kind for use with weighing apparatus.

In connection with weighing apparatus it is desirable that the apparatus should be despatched in such a condition that it can readily be erected for use by a relatively unskilled user and hence it will be appreciated that if possible the dashpot should be sent out filled with the correct amount of damping liquid.

It is found in practice, however, that the despatch of weighing apparatus having the dashpots filled is attended with the disadvantage that the liquid is likely to be spilled whereby the mechanism and the counter, or other support, on which the scale may subsequently be erected will become soiled. On the other hand if the weighing apparatus be despatched with the dashpots unfilled it is found that the subsequent filling of the dashpots occasions considerable difficulty to inexperienced users.

The present invention has for its object the provision of a dashpot having a liquid damping medium which admits of the dashpot being sent out filled with the correct amount of liquid and wherein the disadvantages above referred to are eliminated.

The invention consists of an improved dashpot wherein the dashpot cylinder co-operates with a slidably or rotatably mounted container adapted to have a fluid-tight connection therewith, said container being adapted to receive the liquid from the said dashpot cylinder and to store the same in a liquid tight manner and to return the liquid into the dashpot cylinder as and when required.

The invention will now be described with particular reference to the accompanying sheet of drawings, wherein.

Figure 1:
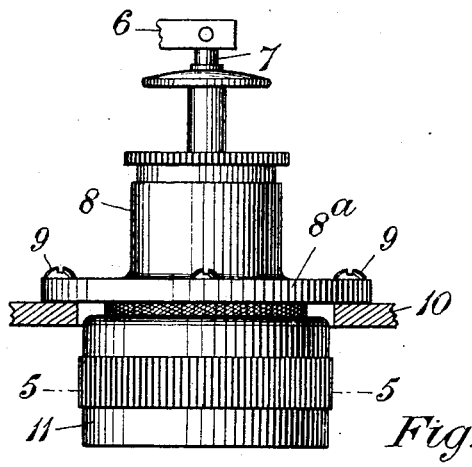
Figure 1 is a part sectional elevation showing the dashpot in its normal working position together with portions of the adjacent parts of an automatic weight indicating counter scale of known construction.

A lever 6 of the scale has a pivotal connection at one end to the upper end of a piston rod 7 which carries at its lower end a dashpot piston 7$^a$ of known construction. This piston is adapted for reciprocation in the usual manner within a cylindrical barrel 8 provided intermediate its ends with a laterally extending flange 8$^a$ provided therein with a plurality of equi-distantly spaced holes 8$^b$ through which are passed screws 9 whereby the barrel 8 is secured to the framing 10 of the base housing of the scale. The lower end of the barrel is closed the inner surface of the bottom 8$^c$ being of a substantially conical shape. The lower end of the barrel is also provided with an outwardly projecting cylindrical flanged portion 8$^d$ the periphery whereof is screw-threaded. The screw-threaded portion of the aforesaid flange 8$^d$ co-operates with the correspondingly threaded bore 11$^a$ of a cylindrical container 11. This container 11 is closed at its lower end and is provided at its upper end with an inwardly turned flange 11$^b$ which overlaps the flange 8$^d$ on the lower end of the barrel 8 the walls of the said inwardly turned flange 11$^b$ having a bearing contact with the external periphery of the dashpot barrel 8. The underface of the inwardly turned flange 11$^b$ of the said container is provided with an annular washer 12 of cork, rubber, or other resilient material. The underside of the intermediately disposed flange 8$^a$ on the dashpot barrel is also provided with a washer 13 of cork, rubber or other resilient material.

The flange 8$^d$ at the lower end of the barrel 8 is formed with a plurality of equidistantly spaced and vertically disposed passages 8$^e$ which co-operate with a plurality of similarly disposed equidistantly spaced and horizontally disposed passages 8$^f$ formed in the wall of the barrel adjacent the closed end thereof.

The operation of the invention is as follows:—

Figure 2:
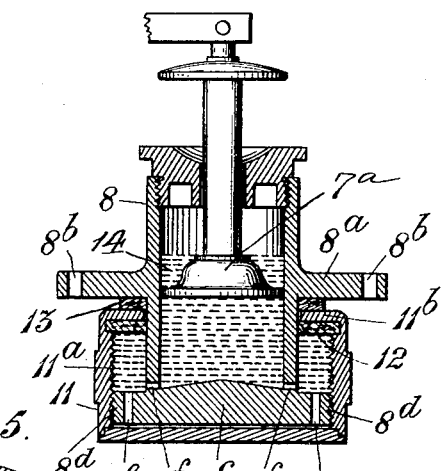
Figure 2 is a vertical section of the dashpot alone showing the relative position of the parts when the dashpot is in its normal working position.
Figure 5:
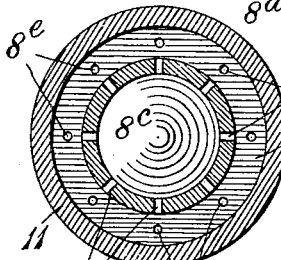
Figure 5 is a transverse section taken on the plane indicated by the line 5—5 Figure 1.

When it is desired to fill or replenish the dashpot the container 11 is rotated in a clockwise direction until the upper face of the inwardly turned flange 11$^b$ at the upper end thereof contacts with the washer 13 on the underside of the intermediately disposed flange 8$^a$ on the dashpot barrel whereby a fluid-tight joint is formed between the contiguous faces. The dashpot barrel is then filled with the damping liquid 14 to the required height (see Figure 2).

Subsequent to the filling of the container to the desired height with the damping liquid the dashpot is ready or use and upon the reciprocation of the lever 6 the dashpot piston 7 reciprocates within the cylinder 8 against the resistance of the damping liquid 14 and checks the movement of the lever in the known manner.

Figure 3:
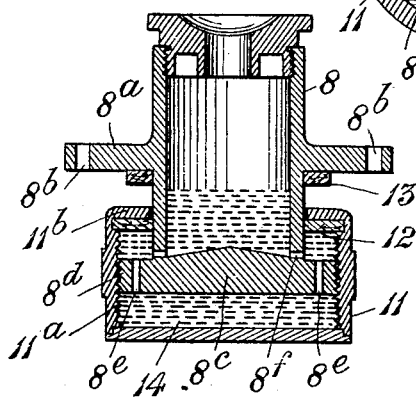
Figure 3 is a similar view to Figure 2 but showing the parts in a position intermediate the positions occupied when the dashpot is in its normal working position or in its fully out of action position.
Figure 4:
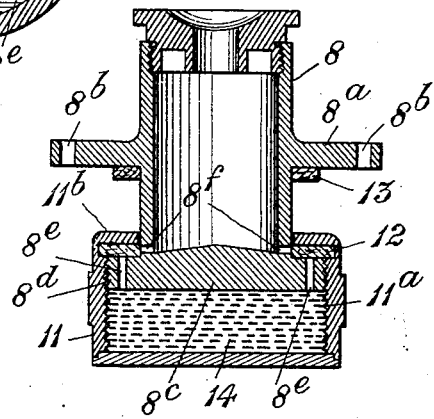
Figure 4 is a similar view to Figure 2 but showing the relative position of the parts when the dashpot is in its fully out of action position.

When it is desired to pack the scale for transport the container 11 is rotated in an anti-clockwise direction so as to tend to remove the same from the dashpot barrel. This operation creates a partial vacuum in the space obtaining between the lower end of the dashpot barrel 8 and the inner walls of the container 11 with the result that the liquid 14 in the dashpot cylinder passes by way of the horizontally disposed passages 8$^f$ in the wall thereof and by way of the vertically disposed passages 8$^e$ in the flange 8$^d$ into the cylinder (see Figure 3). The unscrewing of the container 11 is continued until the washer 12 on the underside of the inwardly turned flange 11$^b$ contacts with the upper face of the flange 8$^d$ and seals the upper end of the vertically disposed passages 8$^e$ formed therein (see Figure 4). In this condition it will be appreciated that the container serves as a liquid-tight reservoir for the damping liquid.

When it is desired to erect the scale it is only necessary to rotate the container 11 in the direction tending to screw the container on to the barrel when the sealing washer 12 on the underside of the inwardly turned flange 11$^b$ is moved away from the upper face of the flange 8$^d$ thereby unsealing the vertically disposed passages 8$^e$ and admitting of liquid passing from the container into the annular space surrounding the barrel whence the liquid passes through the horizontally disposed passages 8$^f$ into the barrel. The rotation of the container 11 is continued until the upper face of the inwardly turned flange 11$^b$ bears on the underside of the washer 13 carried by the intermediately disposed flange 8$^a$ on the dashpot barrel. The dashpot is then ready for use.

It will be appreciated that a dashpot constructed as hereinbefore described permits of a weighing scale being despatched with the dashpot readily filled with damping liquid without the possibility of the said liquid being spilled during transit and capable of being made ready for use without occasioning any difficulty to an inexperienced user.

What I claim is:—

1. A liquid dashpot comprising a dashpot cylinder, a piston adapted for reciprocation within said cylinder, a container, means for placing the interior of the said container into communication with the interior of the cylinder, means for drawing liquid from the cylinder into the container for storage purposes and for subsequently forcing liquid from the container into the cylinder and means for effecting a fluid tight sealing of the means of communication between the interior of the container and the interior of the cylinder.

2. A liquid dashpot comprising a dashpot cylinder, a piston adapted for reciprocation within said cylinder, a container adapted to embrace the lower end of the cylinder and to be capable of motion relatively thereto, a plurality of passages for placing the cylinder into communication with the interior of the container, means for drawing liquid through said passages into the interior of the container and for forcing liquid from the container through said passages into the cylinder and means for effecting a fluid tight sealing of the said passages when the whole of the liquid is stored within the container.

3. A liquid dashpot comprising a dashpot cylinder, a cylindrical flange on the lower end of said cylinder, a piston adapted for reciprocation within said cylinder, a container adapted to embrace the lower portion of the cylinder, a flange at the upper end of the container which overlaps the flange on the cylinder and has a sliding contact with the peripheral surface of the dashpot cylinder disposed above the flange on the said cylinder, a plurality of passages formed in the wall of the lower portion of the dashpot cylinder, a plurality of passages formed in the flange on the said cylinder said passages serving to place the interior of the container into communication with the interior of the dashpot and means for effecting a movement of the container whereby liquid may be sucked from the dashpot cylinder into the container or forced from the container into the dashpot cylinder according to the direction of motion of the container.

4. A liquid dashpot comprising a dashpot cylinder, a cylindrical flange on the lower end of said cylinder, a piston adapted for reciprocation within said cylinder, a container adapted to embrace the lower portion of the cylinder, a flange at the upper end of the container which overlaps the flange on the cylinder and has a sliding contact with the peripheral surface of the dashpot cylinder disposed above the flange on the said cylinder, a plurality of passages formed in the wall of the lower portion of the dashpot cylinder, a plurality of passages formed in the flange on the said cylinder said passages serving to place the interior of the container into communication with the interior of the dashpot, means for effecting a movement of the container whereby liquid may be sucked from the dashpot cylinder into the container or forced from the container into the dashpot cylinder according to the direction of motion of the container, and means for sealing the passages for preventing the liquid passing from the container to the dashpot when it is desired to store the liquid within the container.

5. A liquid dashpot comprising a dashpot cylinder, a cylindrical flange on the lower end of said cylinder, a piston adapted for reciprocation within said cylinder, a container adapted to embrace the lower portion of the cylinder, a flange at the upper end of the container which overlaps the flange on the cylinder and has a sliding contact with the peripheral surface of the dashpot cylinder disposed above the flange on the said cylinder, a plurality of passages formed in the wall of the lower portion of the dashpot cylinder, a plurality of passages formed in the flange on the said cylinder said passages serving to place the interior of the container into communication with the interior of the dashpot, means for effecting a movement of the container whereby liquid may be sucked from the dashpot cylinder into the container or forced from the container into the dashpot cylinder according to the direction of motion of the container, means for sealing the passages for preventing the liquid passing from the container to the dashpot when it is desired to store the liquid within the container means for securing the cylinder to a fixed object and means for limiting the movement of the container relatively to the cylinder.

In testimony whereof, I have signed my name to this specification.

JOHN WILLIAM TAYLOR.